United States Patent [19]

Aviander

[11] 4,150,358
[45] Apr. 17, 1979

[54] TEMPERATURE MEASURING SYSTEM FOR ROTATING MACHINES

[75] Inventor: Stig Aviander, Västeras, Sweden
[73] Assignee: ASEA Aktiebolag, Västeras, Sweden
[21] Appl. No.: 757,009
[22] Filed: Jan. 5, 1977

[30] Foreign Application Priority Data

Jan. 13, 1976 [SE] Sweden .............................. 7600260

[51] Int. Cl.² .............................................. G08C 19/24
[52] U.S. Cl. ................................. 340/189 M; 73/351; 324/65 R; 340/177 VA; 340/195; 340/203; 340/206
[58] Field of Search ................ 340/189 M, 195, 196, 340/203, 207 P, 206, 207 R, 177 VA, 58; 324/34 TE, 83 R, 62, 224, 233, 65 R; 73/351, 362 AR

[56] References Cited

U.S. PATENT DOCUMENTS

| | | | |
|---|---|---|---|
| 3,303,701 | 2/1967 | Matsuura et al. | 73/351 |
| 3,338,100 | 8/1967 | Takami | 340/195 |
| 3,391,576 | 7/1968 | Takami et al. | 73/351 |
| 3,582,924 | 6/1971 | Uemura et al. | 340/206 |
| 3,673,552 | 6/1972 | Mross et al. | 340/206 |
| 3,719,935 | 3/1973 | Chaney | 340/206 |
| 3,742,473 | 6/1973 | Hadden | 340/206 |
| 3,824,857 | 7/1974 | Smith | 73/351 |

*Primary Examiner*—John W. Caldwell, Sr.
*Assistant Examiner*—James J. Groody
*Attorney, Agent, or Firm*—Watson, Cole, Grindle & Watson

[57] ABSTRACT

A system for transmitting signals between stationary and movable portions of a machine without utilizing any direct electrical contacts. An alternating supply source for the system is provided on the stationary portion and is connected to a stationary coupling member of an inductive coupling. A movable coupling member of the inductive coupling is arranged on the movable portion of the machine. A pulse generator connected to the movable coupling member receives its alternating supply voltage through the inductive coupling and generates a pulse during each period of the supply. A temperature dependent resistor controls the pulse generating device so that the phase portion of the pulse in relation to the zero passage of the supply voltage is dependent on the sensed temperature. The pulses are fed back through the inductive coupling to a measuring device arranged on the stationary portion of the machine.

2 Claims, 1 Drawing Figure

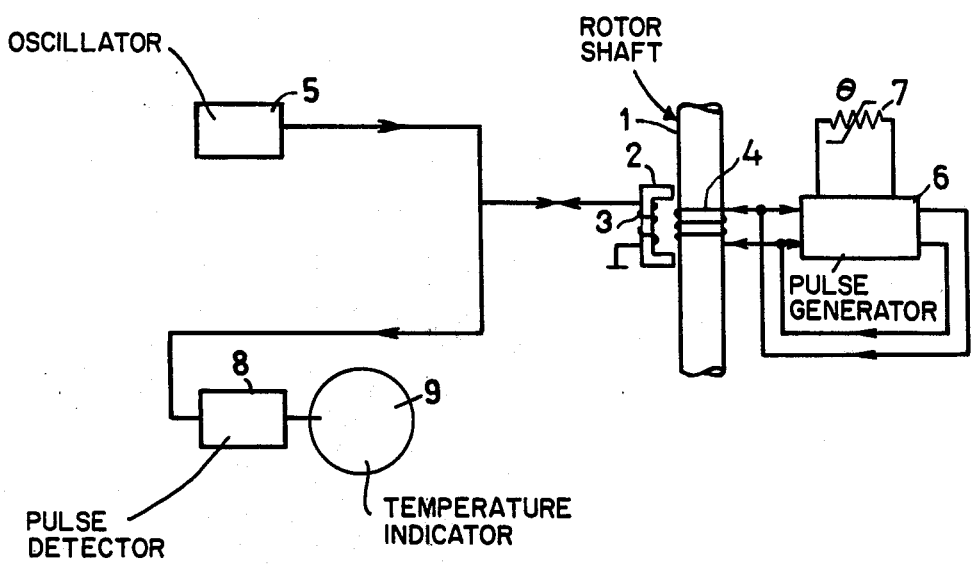

TEMPERATURE MEASURING SYSTEM FOR ROTATING MACHINES

BACKGROUND OF THE INVENTION

The present invention relates to a device for a contact free transmission of signals between stationary and movable portions of a machine or the like.

It is often desirable to be able to transmit signals between, for example, two machine components having different conditions of movement. One example of this is where the temperature in the rotor of a rotating electrical machine is to be measured. When transmitting the measurement signal between the rotating portion and the stationary portion, it is desirable for known reasons to use a non-contact, i.e., contact free, connection between the two machine components. Furthermore, it is desirable to avoid having to arrange a separate supply current source for the part of the measurement device which is arranged in the rotating portion.

SUMMARY OF THE INVENTION

An object of the present invention is to provide a contact free signal transmission system for transmitting signals between stationary and movable portions of a machine.

Another object of the present invention is to provide a system for transmitting signals between stationary and movable portions of a machine in which it is possible to avoid having to use a separate supply current source in the movable portion.

According to the present invention both of these desires are fulfilled by connecting the supply source for the entire system as well as the indicating device to the stationary member of an inductive coupling, whereas a pulse generating device arranged in the movable portion of the machine is connected to the movable member of the coupling. The auxiliary supply voltage from the source to the pulse generating device as well as the signals from the pulse generating device are transmitted by way of the inductive coupling.

BRIEF DESCRIPTION OF THE DRAWING

The accompanying drawing shows a schematic circuit diagram of a contact free signal transmission system in accordance with the present invention.

DESCRIPTION OF THE PREFERRED EMBODIMENT

As an exemplary embodiment of the present invention, a system for providing a measurement of the temperature in the rotor of a rotary machine will be described below. The machine includes a rotor shaft 1 and a stationary U-shaped magnetic core 2. A magnetic coupling is used for transmitting an auxiliary voltage and signal pulses between the stator, the stationary core, and rotor of the machine. The coupling has a stationary member and a rotating member, the latter being arranged on the rotor shaft. The stationary coupling member is formed by a winding 3 on the U-shaped magnetic core 2. The rotating coupling portion includes a winding 4 on the shaft.

The above description presupposes that the shaft is formed of magnetic material, which is usually the case. If the shaft is formed of a non-magnetic material, the winding can be wound on a magnetically conducting bobbin, in which the flux can be formed.

An oscillator 5 for generating a sinusoidal alternating voltage is connected to winding 3 for generating a sinusoidal magnetic field in the shaft or the bobbin. The frequency of the oscillator is chosen with regard to the size of the magnetic circuit, the air gap and the highest limit of the frequency of the signal source. Furthermore, an even multiple of the power frequency should not be chosen. Thereby the frequency of the oscillator will not be able to resonate with the power frequency.

The magnetic field generated in the rotor shaft generates a corresponding alternating voltage in winding 4, and this voltage is supplied to a pulse generating device 6 in the rotor. The pulse generating device is arranged to generate one pulse during each period of the transmitted alternating voltage. This means that the pulse can be given a large energy content, which is desirable because of the relatively great energy losses occurring in the air gap of the magnetic coupling. The voltage required for driving the pulse generating device is obtained by rectifying and smoothing the positive half-wave of the transmitted alternating voltage. Since the frequency of the alternating voltage is relatively high—on the order of magnitude of a few thousand Hz—the ripple becomes negligible and a pure direct voltage in the rotor portion may be counted on.

A temperature-dependent resistor 7 arranged in the rotor portion is connected to the pulse generating device. Resistor 7 controls the pulse generating device in such a manner that the phase position of the delivered pulses in relation to the zero passage of the alternating voltage becomes dependent upon the resistance of resistor 7. Thus, the phase position of the pulses in relation to the zero passage of the alternating voltage is a measure of the temperature at the location in the rotor where the resistor is placed.

The pulses generated in the pulse generating device are returned to the stator through the magnetic coupling so that practically the same pulses will occur in winding 3 as those generated in the rotor. What is essential is that the pulses maintain their original phase position in relation to the zero passage of the alternating voltage. The pulses in the stator are fed to a pulse detector 8, to which there is also supplied the sinusoidal signal from oscillator 5. In the pulse detector, the sinusoidal signal and the pulses from the rotor are compared and the time between the zero passage of the sine wave and the pulse is determined. This time differential forms a measure of the temperature prevailing in the rotor, which temperature is indicated on instrument 9.

It is noted that the above description and the accompanying drawing are provided merely to present an exemplary embodiment of the present invention and that additional modifications of such embodiment are possible within the scope of this invention without deviating from the spirit thereof.

I claim:

1. Apparatus for a contact free transmission of signals between a stationary portion and a movable portion of a machine comprising:

inductive coupling means including a stationary coupling member arranged on said stationary portion of said machine and a movable coupling member arranged on said movable portion of said machine, said movable coupling member including two connection terminals, and said stationary coupling member including at least a first terminal;

an oscillator for generating an AC auxiliary voltage signal with a defined zero passage, the output of said oscillator being connected to said first terminal for transmission of said auxiliary voltage to said movable portion of said machine;

a pulse detector connected to said first terminal;

a pulse generating means connected to said two connection terminals;

a transducer arranged in said movable portion of the machine for providing a variable measurable quantity to be transmitted to said stationary portion of said machine and said transducer being connected to said pulse generating means;

said pulse generating means being arranged to generate short pulses having respective phase positions in relation to respective zero passages of the auxiliary voltage signal dependent upon the level of the measurable quantity; and, said pulse detector being supplied with said auxiliary voltage signal and pulses from said pulse generating means through said inductive coupling, said pulse detector being arranged to determine the phase position of such pulses which is indicative of the level of the measurable quantity.

2. Apparatus as defined in claim 1, wherein the transmitted auxiliary voltage is a supply voltage for said pulse generating means.

* * * * *